United States Patent Office 3,448,077
Patented June 3, 1969

3,448,077
THERMALLY CRYSTALLIZABLE POLY(BIS-PHENOL ESTERS) OF 3,5-DICHLORO SUBSTITUTED BISPHENOL AND ADIPIC OR SUCCINIC ACID
André Jan Conix, Antwerp, and Leonard Marie Dohmen, Berchem, Belgium, assignors to Gevaert-Agfa N.V., Mortsel, Belgium, a Belgian company
No Drawing. Original application Sept. 23, 1963, Ser. No. 310,916. Divided and this application Jan. 18, 1968, Ser. No. 698,723
Claims priority, application Belgium, Sept. 26, 1962, 41,991, Patent 622,858
Int. Cl. C08g 17/08, 53/00
U.S. Cl. 260—47                          1 Claim

ABSTRACT OF THE DISCLOSURE

Crystallization of a resinous poly(bisphenol ester) of 2,2-bis(4-hydroxy-3,5-dichlorophenyl)-propane and adipic acid or succinic acid by heating said poly(bisphenol ester) to a temperature at least about ten degrees above its second order transition temperature but not higher than about ten degrees below its crystalline melting point.

---

This application constitutes a division of our application Ser. No. 310,916 filed Sept. 23, 1963, now abandoned.

It is known to prepare poly(esters) from bisphenols and diabasic acids. The poly(bisphenol esters) which have been described so far are amorphous materials which cannot be crystallized by a simple thermal treatment.

It is also known that, when the crystallization of polymers can be carried out during or after stretching films or threads prepared from the melt of said polymers, said stretched crystalline films or threads have improved mechanical properties than the stretched amorphous films or threads.

Surprisingly it has now been found that certain poly(bisphenol esters) can be crystallized by a simple thermal treatment.

According to the invention thermally crystallizable poly(bisphenol esters) are obtained by condensation of 2,2-bis(4-hydroxy-3,5-dichloro-phenyl)-propane and lower aliphatic dicarboxylic acids.

Succinic acid and adipic acid are very well suited for being used as lower aliphatic dicarboxylic acids.

By quenching films, sheets, fibres, threads etc. prepared from a melt of the poly(bisphenol esters) amorphous films, sheets, fibres, threads, etc. are obtained.

It has now been stated that amorphous films, sheets, fibres, threads etc. prepared from the poly(bisphenol esters) according to the invention are easily crystallized thermally by heating said films, sheets, fibres, threads, etc. for a short time within a temperature range comprised between about ten degrees above the second order transition temperature of the poly(bisphenol ester) and about ten degrees below the crystalline melting point of the poly(bisphenol ester). The heating time and temperature required depend mainly on the specific aliphatic dicarboxylic acid used in the polycondensation.

As will be seen in the examples, crystallization of a poly(bisphenol ester) of 2,2-bis(4-hydroxy-3,5-dichlorophenyl)-propane and adipic acid is obtained after heating for 6 minutes at 175° C. However, when the same poly(bisphenol ester) is heated at 220° C. 3 minutes suffice for obtaining a crystalline poly(ester).

This possibility of being thermally crystallized is very surprising. In deed, when replacing in the polycondensation 2,2-bis(4-hydroxy-3,5-dichlorophenyl)-propane by a bisphenol which has no chlorine substituents on the phenyl nuclei or by a bisphenol wherein the chlorine substituents are replaced by methyl groups, poly(bisphenol esters) are obtained which are not at all thermally crystallizable or in which the crystallization rate is too slow to be suited for practical applications.

The properties of films, sheets, fibres, threads etc. prepared from the amorphous poly(bisphenol esters) according to the invention are markedly improved by crystallization.

The polycondensation of the lower aliphatic dicarboxylic acids with 2,2-bis(4-hydroxy-3,5-dichlorophenyl)-propane (hereinafter referred to as "bisphenol") can be carried out according to different known techniques which are also applied for the preparation of other linear poly esters. According to a first process the aliphatic dicarboxylic acid is allowed to react in the melt with the diacetate of the bisphenol or with the bisphenol itself but then in the presence of acetic anhydride.

In a second process the polycondensation is carried out by transesterification in the melt and under reduced pressure of mixtures of the bisphenol and of the phenyl ester of the aliphatic dicarboxylic acid whereby phenol is set free.

In a third process, which is preferred to the aforesaid processes, the condensation occurs at room temperature and in the presence of a catalyst. An alkali diphenolate of the bisphenol, dissolved in water is allowed to react with the diacid chloride of the aliphatic dicarboxylic acid dissolved in a water-immiscible inert organic solvent which is at the same time a solvent or swelling agent for the poly(bisphenol ester) to be formed. The last process is among others described by A. Conix in Ind. Chim. Belge 22 (1957) 1457 and Ind. Eng. Chem. 51 (1959) 147.

As common solvents or swelling agents for the diacid chlorides and the poly(esters) to be formed chlorinated aliphatic hydrocarbons are preferably used such as methylene chloride, chloroform, 1,2,-dichloroethane, 1,1,2-trichloroethane, sym-tetrachloroethane, methyl chloroform, dichloro ethylene etc. Other water-immiscible organic solvents such as benzene, toluene etc. may be used in combination with the chlorinated aliphatic hydrocarbons.

As catalysts may be used onium compounds such as quaternary ammonium, phosphonium or arsonium compounds or tertiary sulfonium compounds. They are preferably added to the reaction mixture in amounts of from 0.1 to 5% by weight of the bisphenol. The best suited catalysts are those which are soluble in the aqueous phase as well as in the organic phase. They may be added before, during or after mixing both phases.

The diacid chlorides and the diphenolates are preferably allowed to react in stoichiometrically equivalent amounts. This is, however, not at all necessary and the admissible deviations from the equimolar ratio may amount up to 10%.

The polycondensation can be carried out at temperature comprised between −10° C. and the boiling point of the solvent used. However, since the hydrolyzability of diacid chlorides of lower aliphatic dicarboxylic acids is relatively high the temperature of the reaction medium is kept as low as possible by cooling, preferably at about 0° C.

The poly(bisphenol esters) according to the present invention are soluble in volatile solvents such as methylene chloride, 1,2-dichloroethane, chloroform, tetrahydrofuran, cyclohexanone. The solutions of these poly(bisphenol esters) can be cast to form colorless transparent and flexible films, sheets, fibres, threads etc. Due to their thermoplastic properties they can be worked up to shapened objects via the usual techniques such as compression moulding, injection moulding, extrusion or vacuum forming. These shaped objects are characterized by their high dimensional stability and their good shock resistance.

As stated above colorless, transparent and flexible films can be manufactured from the poly(bisphenol esters) according to the invention. The films can be stretched in one or two directions whereby their tensile strength is markedly improved. Biaxially stretching may occur in both directions to the same or different extent. Because of these properties and due to other excellent mechanical properties these films are very well suited for being used as support for photographic film elements, for magnetic sound recording materials, and for tape, as packaging material and as electric insulating material.

Said poly(bisphenol esters) may also be used as protective coatings for photographic materials since they absorb little water and have a low water-permeability. Because of their good solubility in the usual solvents they may be worked up to all kinds of auxiliary layers such as subbing layers, adhesive layers, filter layers, stripping layers etc.

The following examples illustrate the present invention.

EXAMPLE 1

In a 2-litre three-necked flask fitted with a stirrer, a thermometer and a dropping funnel 73.2 g. of 2,2-bis(4-hydroxy-3,5-dichlorophenyl)-propane, 16.4 g. of sodium hydroxide and 2.2 g. of triphenyl benzyl phosphonium chloride are dissolved in 500 cm.$^3$ of water. To this solution are added 200 cm.$^3$ of methylene chloride. The liquid is cooled to $-2°$ C. and while strongly stirring a solution of 37.0 g. of pure adipoyl chloride in 200 cm.$^3$ of methylene chloride is dropwise added in 15 minutes. The very viscous polymer solution is stirred for another hour at $-2°$ C. whereupon it is washed with ice water. The polymer is precipitated by pouring the solution into ethanol. The intrinsic viscosity measured at 25° C. in sym-tetrachloroethane is 0.94 dl./g.

A melt of the poly(bisphenol ester) obtained at 290° C. becomes amorphous by quenching. The formed glassy polymer crystallizes by heating at 175° C. for 6 minutes and at 220° C. for 3 minutes. This is very surprising the more so as when replacing in the above polycondensation 2,2-bis(4-hydroxy-3,5 - dichlorophenyl) - propane by 2,2-bis(4-hydroxyphenyl)-propane, thus by a compound having no chlorine substituents on the phenyl nuclei, a poly(bisphenol ester) is obtained which only after heating for 24 hours at 175° C. begins to crystallize and that very slowly. At 220° C. a few spherulites can be observed only after 24 hours. The further crystal growth proceeds very slowly.

As a third comparative poly(bisphenol ester) was prepared according to the above condensation method the poly(bisphenol ester) of adipic acid and 2,2-bis(4-hydroxy-3,5-dimethyl-phenyl)-propane, thus using a bisphenol bearing methyl substituents instead of chlorine substituents. The poly(bisphenol ester) obtained softens at about 130° C. and the last double refraction disappears at about 250° C. However, the polymer does not crystallize neither after heating for 24 hours at 175° C. nor after heating for 24 hours a 220° C.

EXAMPLE 2

5.84 g. of adipic acid, 18.1 g. of the diacetate of 2,2-bis(4-hydroxy-3,5-dichlorophenyl)-propane and 2 mg. of butyl orthotitanate are melted at 255° C. Acetic acid is split off immediately and the melt becomes rapidly viscous. Condensation proceeds for another 3 hours at 255° C. while applying a vacuum of 0.1 mm. Hg. When cooling a very strong glassy polymer having the same properties as the poly(bisphenol ester) of Example 1 is obtained.

EXAMPLE 3

In a three-necked flask 18.305 g. of 2,2-bis(4-hydroxy-3,5-dichloro-phenyl)-propane are dissolved in 102 cm.$^3$ of N sodium hydroxide whereupon 100 mg. of triphenyl benzyl phosphonium chloride and 60 cm.$^3$ of 1,1,2-trichloroethane are added. The liquid is cooled to $-2°$ C. and while strongly stirring a solution of 7.83 g. of succinyl chloride in 50 cm.$^3$ of trichloroethane is added dropwise in 5 minutes. The very viscous polymer solution is stirred for another hour at 0° C. whereupon it is washed with ice water. Then the polymer is precipitated by pouring the solution into ethanol. The intrinsic viscosity measured at 25° C. in sym-tetrachloroethane is 0.80 dl./g.

From a solution of the polymer in sym-tetrachloroethane transparent films can be cast. The polymer can be thermally crystallized by heating for 6 hours at 200° C. The spherulites melt at 271° C. If in the polycondensation 2,2-bis(4-hydroxy-3,5-dichlorophenyl)-propane is replaced by 2,2-bis(4-hydroxyphenyl)-propane not a trace of crystallization can be observed after heating for 24 hours at 175° C. or at 220° C.

We claim:
1. A method of crystallizing a resinous poly(bisphenol ester) of a mixture consisting essentially of 2,2-bis(4-hydroxy-3,5-dichlorophenyl)-propane and adipic acid or succinic acid, which method comprises heating said poly (bisphenol ester) to a temperature at least about ten degrees above its second order transition temperature but not higher than about ten degrees below its crystalline melting point.

References Cited

UNITED STATES PATENTS

| | | |
|---|---|---|
| 3,133,898 | 5/1964 | Keck. |
| 3,216,970 | 11/1965 | Conix. |
| 3,230,195 | 1/1966 | Conix. |
| 3,246,067 | 4/1966 | Boyer. |

OTHER REFERENCES

Bjorksten: Polyesters and Their Application, Reinhold Publishing Corp., New York, p. 208.

WILLIAM H. SHORT, *Primary Examiner.*

L. P. QUAST, *Assistant Examiner.*

U.S. Cl. X.R.

260—33.8